(12) United States Patent
Waghulde

(10) Patent No.: US 10,496,283 B2
(45) Date of Patent: Dec. 3, 2019

(54) ADAPTIVE PREFIX TREE BASED ORDER PARTITIONED DATA STORAGE SYSTEM

(71) Applicant: Suraj Prabhakar Waghulde, Fremont, CA (US)

(72) Inventor: Suraj Prabhakar Waghulde, Fremont, CA (US)

(73) Assignee: Suraj Prabhakar Waghulde, Fremont, CA (US)

( * ) Notice: Subject to any disclaimer, the term of this patent is extended or adjusted under 35 U.S.C. 154(b) by 407 days.

(21) Appl. No.: 15/396,420

(22) Filed: Dec. 31, 2016

(65) Prior Publication Data

US 2017/0212680 A1 Jul. 27, 2017

Related U.S. Application Data

(60) Provisional application No. 62/286,169, filed on Jan. 22, 2016.

(51) Int. Cl.
*G06F 3/06* (2006.01)
*G06F 17/30* (2006.01)
(Continued)

(52) U.S. Cl.
CPC .............. *G06F 3/061* (2013.01); *G06F 3/064* (2013.01); *G06F 3/067* (2013.01); *G06F 3/0616* (2013.01); *G06F 3/0619* (2013.01); *G06F 3/0625* (2013.01); *G06F 3/0644* (2013.01); *G06F 3/0656* (2013.01); *G06F 11/00* (2013.01); *G06F 11/1464* (2013.01); *G06F 11/1469* (2013.01); *G06F 11/1471* (2013.01); *G06F 12/0261* (2013.01); *G06F 16/185* (2019.01); *G06F 16/2246* (2019.01); *G06F 16/27* (2019.01); *G06F 17/00* (2013.01); *G06F 2201/80* (2013.01); *G06F 2201/84* (2013.01); *G06F 2212/1016* (2013.01); *G06F 2212/1028* (2013.01); *G06F 2212/1036* (2013.01); *G06F 2212/154* (2013.01); *G06F 2212/261* (2013.01); *G06F 2212/263* (2013.01); *G06F 2212/305* (2013.01); *Y02D 10/13* (2018.01)

(58) Field of Classification Search
None
See application file for complete search history.

(56) References Cited

U.S. PATENT DOCUMENTS

| 10,303,673 | B2 * | 5/2019 | Vemulapati | G06F 16/2246 |
| 2013/0046949 | A1 * | 2/2013 | Colgrove | G06F 3/0608 |
| | | | | 711/170 |
| 2015/0293958 | A1 * | 10/2015 | Chen | G06F 16/2246 |
| | | | | 707/797 |

* cited by examiner

*Primary Examiner* — Kenny S Lin

(57) ABSTRACT

Methods, systems, apparatus including computer programming encoded on a computer storage medium for efficiently storing data across memory hierarchy on one or plurality of nodes include creating ordered partitions of data based on key where partition order is achieved using highly space optimized prefix tree index. Within a partition, data is fully or partially ordered based on key. Multiple prefix tree indices are created one for each memory hierarchy and all are stored in fast memory like DRAM. Data is merged or moved from faster memory to slower memory in the hierarchy as the space is used up. Checkpoint mechanism along with WAL provides recovery guarantee and data snapshots. Distributed data storage systems like databases/key value stores can utilize this data storage mechanism to store and retrieve data efficiently across memory hierarchy on one or plurality of nodes.

12 Claims, 19 Drawing Sheets

(51) Int. Cl.
*G06F 11/14* (2006.01)
*G06F 12/02* (2006.01)
*G06F 16/27* (2019.01)
*G06F 16/22* (2019.01)
*G06F 17/00* (2019.01)
*G06F 11/00* (2006.01)
*G06F 16/185* (2019.01)

| 501 | 502 | 1800 | 503 |
|---|---|---|---|
| 3 | aba | 30 | 0x7fff9575c02a |
| 4 | abac | 65 | 0x7fff9575c05c |
| 5 | abacas | 228 | 0x7fff9575c173 |
| 9 | abacinate | 117 | 0x7fff9575c1c2 |
| 11 | abacination | ... | 0x7fff9575c09b |
| 9 | abaciscus | ... | 0x7fff9575c13a |
| 5 | aback | ... | 0x7fff9575c153 |

Sorted keys list
409

Figure 18

ADAPTIVE PREFIX TREE BASED ORDER PARTITIONED DATA STORAGE SYSTEM

CROSS-REFERENCE TO RELATED APPLICATIONS

This application claims the benefit of U.S. Provisional Patent Application No. 62/286,169, filed Jan. 22, 2016, the contents of which is hereby incorporated by reference herein, in its entirety, for all purposes.

BACKGROUND OF THE INVENTION

The disclosed embodiments relate generally to data storage systems and novice methods of efficiently storing and retrieving data across memory hierarchy on one or plurality of nodes with help of space optimized prefix tree index.

DESCRIPTION OF RELATED ART

Key value based data stores have become backbone for real time serving of internet scale data. Key value stores in use today most commonly store their data using Log Structured Merge Tree (LSM) approach. LSM approach is only efficient for hard disk drive memory technology and write intensive workload since it writes data mostly sequentially avoiding disk seeks. Disk seek latency in hard disk drive is very high 5 milliseconds compared to upcoming non-volatile memory technologies e.g., flash memory (100 microseconds) and will be even lower for new non-volatile memories Resistive RAM (RRAM)/Magnetic RAM (MRAM)/3D XPoint/Phase Change Memory (PCM).

Most of the highly scalable data storage systems have write intensive workload and need lot of space to store internet scale data. So these scalable distributed data storage systems use LSM approach to be cost effective since cost of hard disk drive is a lot lower than flash memory. Today flash memory is progressively making its way in to data infrastructure quickly and other types of non-volatile memories like Resistive RAM and Magnetic RAM/3D XPoint/Phase Change Memory will possibly be used in data infrastructure of a software company. Mass manufacturing of these new memory technologies are driving the cost of them lower. Still the key value storage engines have not explored a completely new paradigm for storage engine that can utilize these new memory technologies optimally. Old approaches like LSM or variations of B-Tree index are still used to store data for these scalable key value stores or databases which are not created to take benefit of memory hierarchy and physical properties memory. We need novice approach that can efficiently store data across memory hierarchy on one or plurality of nodes.

BRIEF SUMMARY OF THE INVENTION

Numerous data stores exist today. Primary interface of reading and writing data in most of the data stores is based on key value. Some data stores are used as simple key value cache while many others are used as database storage engine. Many database application clients read and write to data store in terms of keys and values providing complex query processing. Many databases which are distributed provide data distribution mechanism and fault tolerance through replication but still read and write to data stores on different nodes in terms of keys and values. Many software application clients read and write to and from the data stores in terms of keys and values. So the primary way of read and write data to the data store is key value. Methods and systems provided in this patent are for key value data store underlying all of these data applications irrespective of specific functionality of one application over the other.

A memory hierarchy defines the order of memories based on their read and write latencies in combination with interconnect delays over any kind of interconnect (memory bus/DIMM/PCI/ethernet) whether it is on one node (embedded data store) or plurality of nodes (distributed data store). The network arrangement for distributed data store can be as specified in U.S. patent application Ser. No. 10/613,626, entitled "System and Method For Data Distribution," filed Jul. 3, 2003, which is used as a reference herein as a distributed system having multiple processors, possibly including network attached storage nodes, that are interconnected by one or more communication networks.

Storage engine typically manages files on the media device. On the granular level, it manages building and reading physical pages to store and retrieve data. It uses data buffer to build pages. It handles all I/O to persistent media through files. It controls concurrency and provide logging, recovery etc. The methods and systems described in this patent provides all such operations that database/data store needs. Some of high level operations like transaction semantics, snapshots or higher level language like SQL query processing could be built on the top of the data store storage engine methods and systems we explain here.

The invention describes a data storage system with a novice storage engine that efficiently stores data across memory hierarchy on a node (embedded data store) or plurality of nodes (distributed data store).

Some embodiments describe how data is order partitioned using prefix tree index. The partition represents a data chunk which is independently ordered. Ordering within the partition happens in fast memory available like DRAM. Once the data occupies more space than configurable threshold, data within the partition is ordered for the last time and can be saved or moved to slower non-volatile memory creating an immutable data block.

Some embodiments describe how prefix tree index is space optimized and retrieves data efficiently. Prefix tree is created for partitions and not for each key so size of prefix tree can be controlled by choosing the partition size. Also prefix tree index has smallest size compared to any other indexing mechanism which allows us to put the entire index in fast memory like DRAM. Secondary indices can be created and can also be put in fast memory like DRAM. Index is space optimized so that it can be serialized to slower non-volatile memories periodically with deltas. Prefix tree index retrieves data faster since it alphanumerically assigns bucket to each character compared to fixed fan out of B-tree. At the same time prefix tree preserves the order to allow range queries that provides guarantee to achieve any complex database query functionality desired.

Some embodiments describe how the new data and data updates propagate through the memory hierarchy. Some embodiments describe how we efficiently store data on new memory technologies utilizing their specific properties like block erase, superblock concepts and address translation mechanism. The efficiency lies in reducing write amplification hence gain in performance and lifetime of these memory technologies. Some embodiments describe recovery methods in case of a failure. Data storage system can recover the stored data using write ahead log.

Some embodiments describes methods and systems to directly write and read data blocks using prefix tree index rather than writing it to the files. This eliminates file systems overhead and gives more control on writing data optimally to specific memory technology utilizing specific properties of that memory technology.

Some embodiments describe write ahead logging and checkpoint mechanism for recovery. Checkpoints can also be used to capture consistent snapshots. The mechanism to persist the prefix index to the non-volatile memory provides recovery of index for data blocks in non-volatile memory.

Thus methods and systems are provided for storing data efficiently across memory hierarchy in embedded or distributed data store. These methods and systems help faster data retrieval and storage without blocking any functionality a database can provide. e.g., use of hash indexing can't provide efficient range scan. Described methods and systems in embodiments provide all basic functionality, a data store or database storage engine can provide. A distributed data store can be built with full database functionality or existing embedded or distributed data stores can use these methods and systems for storing their data as key values to improve their efficiency. This improvement includes order of magnitude faster retrieval of data, faster data storage, reduce energy and cost since the use of fast memory like DRAM is reduced and lifetime of memory technologies is increased by wisely utilizing their properties.

BRIEF DESCRIPTION OF THE SEVERAL VIEWS OF THE DRAWINGS

FIG. 18 is depicts sorted keys list incorporating value length.

Reference will now be made in detail to embodiments, examples of which are illustrated in the accompanying drawings. In the following detailed description, numerous specific details are set forth in order to provide a thorough understanding of the present invention and fine details to explain the entire system. However, it will be apparent to one of ordinary skill in the art that the present invention may be practiced with the same ideas and functionality without these fine details or altering specific methodologies to achieve the same functionality.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that steps that elaborate methodology and/or functionality of different components of the system as well as the terms "comprises" and/or "comprising," when used in this specification, specify the presence of stated features, steps, operations, elements, and/or components, but do not preclude the presence or addition of one or more other features, steps, operations, elements, components, and/or groups thereof.

DETAILED DESCRIPTION OF THE INVENTION

Figure 1:
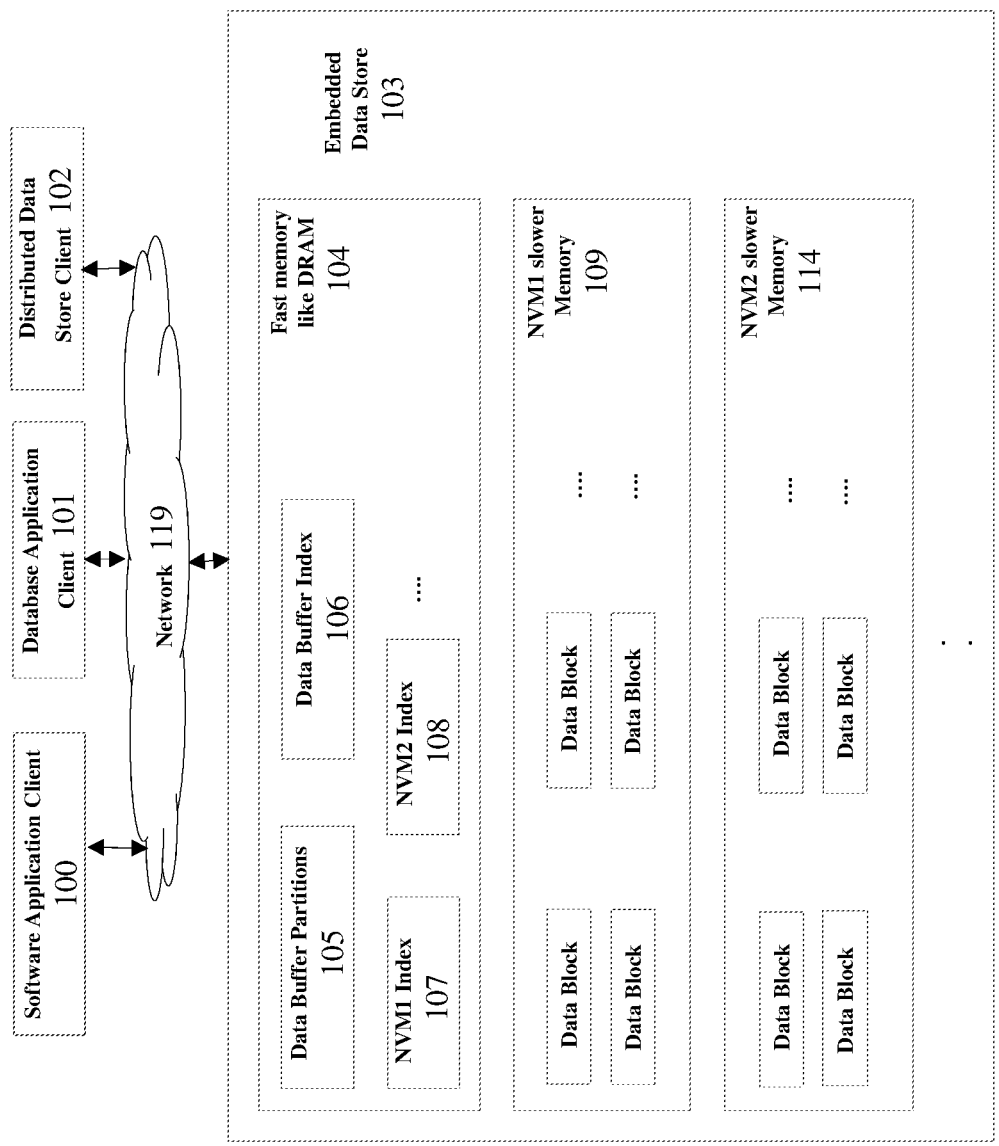
FIG. 1 is a block diagram representing high level architecture of embedded data store in a single machine node or data store on each single data node in a distributed data storage system.
Figure 2:
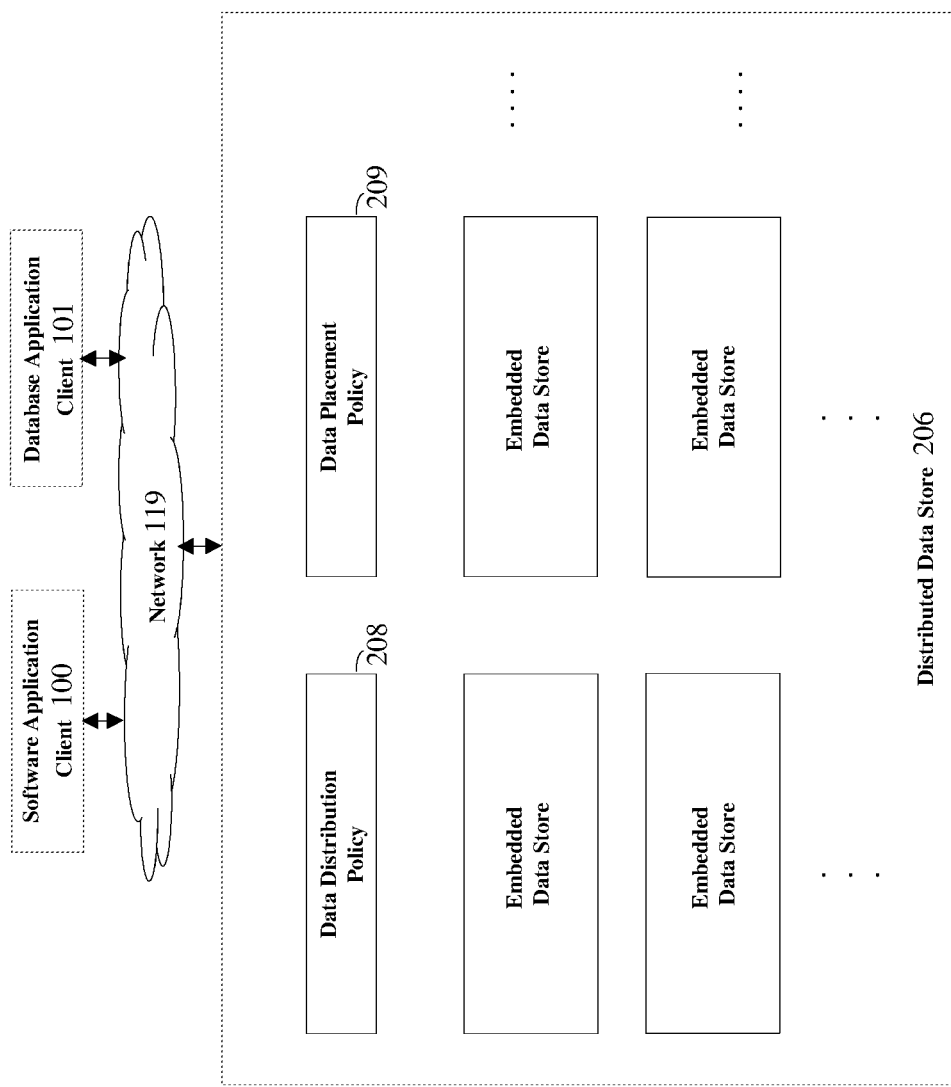
FIG. 2 is a block diagram representing distributed data storage system utilizing data storage system represented in FIG. 1 on each data node in the distributed system available for storing data.

FIG. 1 is a block diagram representing high level architecture of embedded data store in a single machine node or data store on each data node of a distributed data storage system shown in FIG. 2. The storage system in FIG. 1 is used over the internet network 119 by different software application client programs 100 that could be simple web application or desktop software application that needs to store and retrieve data fast. Single node embedded database application client 101 can store and retrieve data from the data store in FIG. 1 and can provide complex queries or analytics to other software applications. Similarly client 102 of distributed data store that is either distributed data base like Cassandra/HBase etc., or distributed key value store like redis/memcached etc., or distributed computing framework like apache spark/apache hadoop etc., or distributed publisher subscriber like apache kafka etc., that needs to store and retrieve data that is supporting internet scale application running on plurality of nodes accessing storage system in FIG. 2 to read and write data encompassing several data nodes running embedded data store as shown in FIG. 1

Figure 4A:
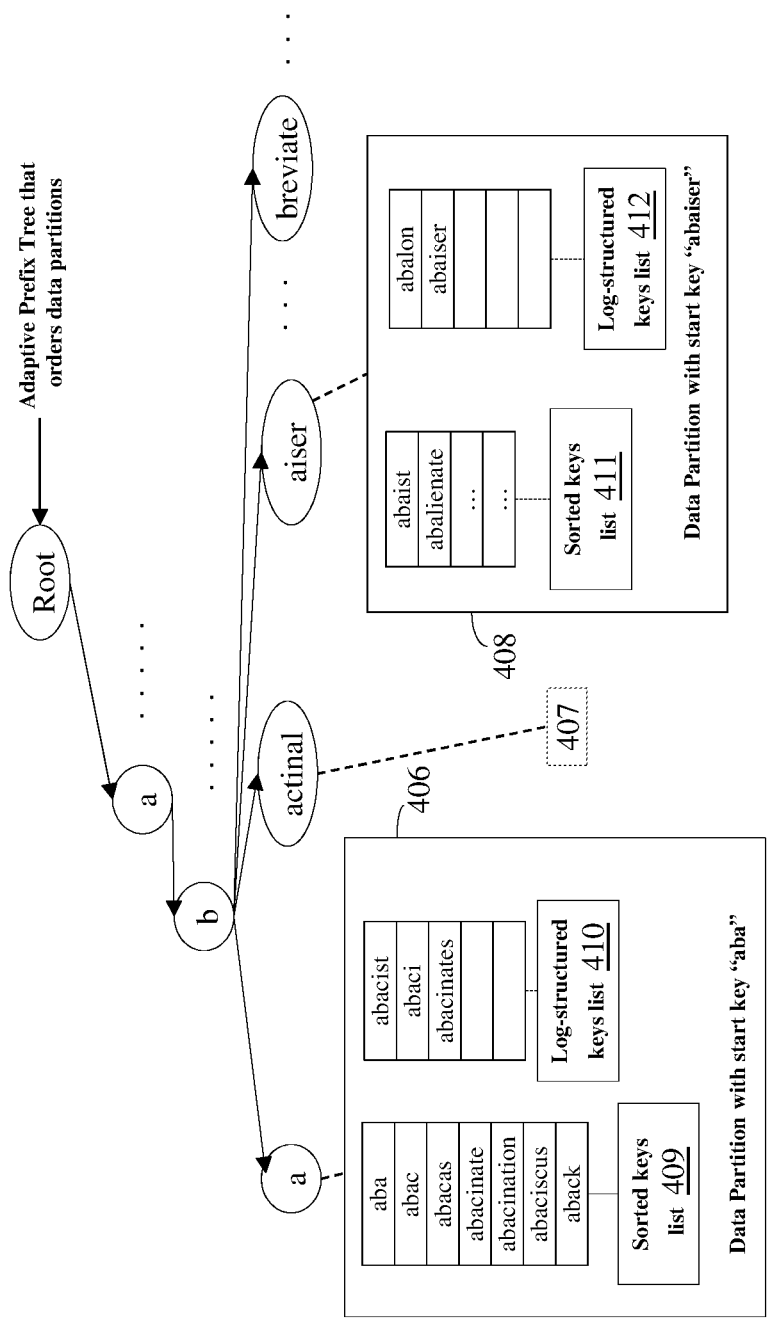
FIG. 4A and FIG. 4B is a diagram of space optimized adaptive prefix tree data structure and methodology used to order the data partitions.
Figure 4B:
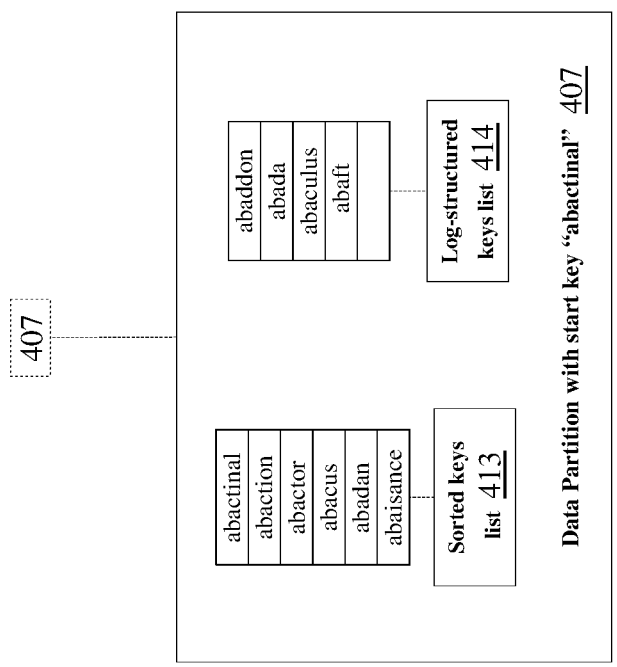
Figure 5:
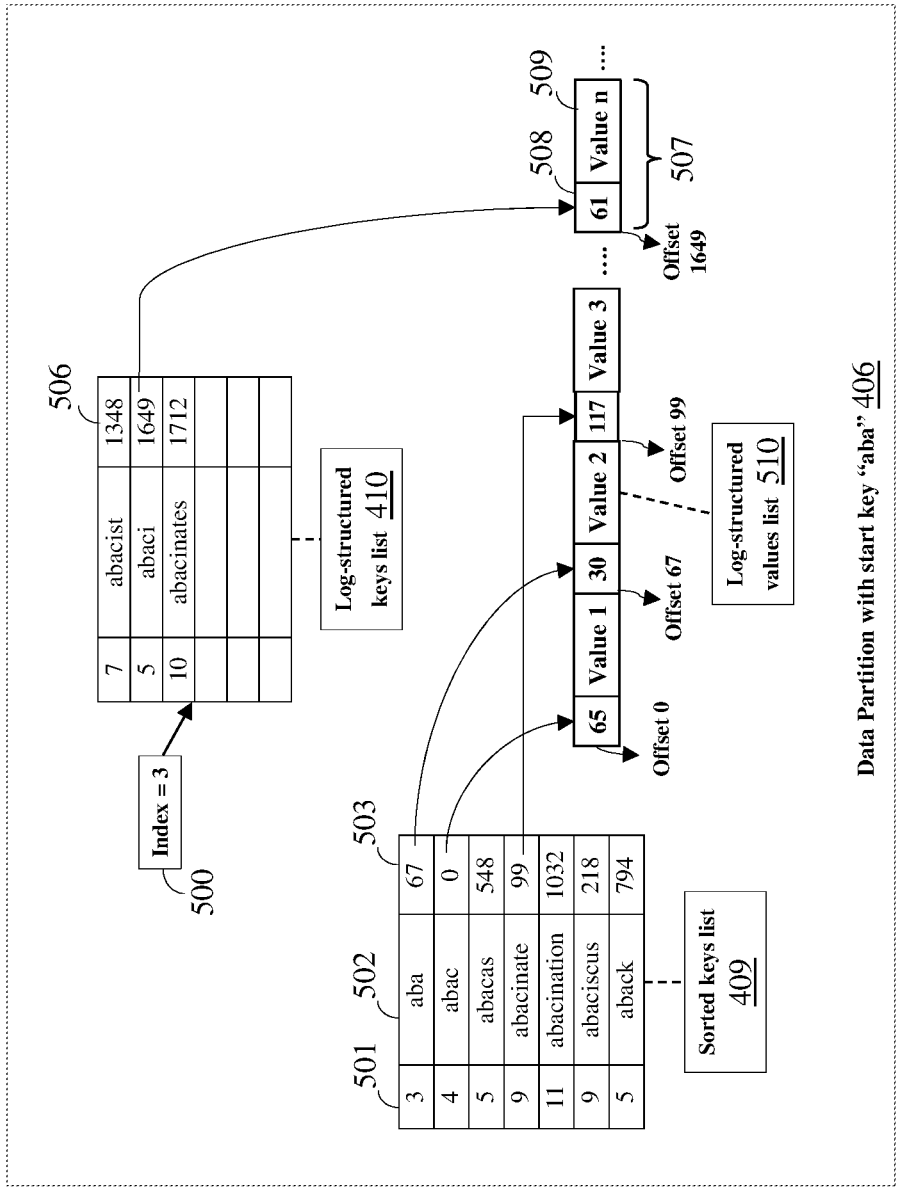
FIG. 5 is a block diagram of elaborated data partition in data buffer with log-structured values list.

Data buffer in fast memory like DRAM 104 helps to buffer the recent data inserts (updates/deletes are special kind of inserts) and to serve lookups on the recently inserted/updated/deleted entries in the data store. Data in the data buffer is partitioned in to data partitions 105. Each data partition has mutually exclusive range of key values that are partially sorted in the data partition. When any operation on data store is invoked like lookup/insertion/update/deletion operation, the key of the data in the operation determines which partition 105 the operation should be executed on. The partition is searched such that the data key would fall in to the key range of that partition. Prefix Tree as illustrated in FIG. 4A and FIG. 4B has start key of each partition. Prefix tree index helps to efficiently find the partition where the data operation should be performed by traversing the prefix tree comparing the data key with the start key.

Adaptive Radix Tree as described by Viktor Leis in research paper 'ARTful indexing for main-memory databases' published in International Conference of Data Engineering 2013. Adaptive radix tree is optimized type of prefix tree. Adaptive radix tree is used to explain prefix tree index in the system and methods provided. This prefix tree index is further space optimized to keep the entire index in fast memory like DRAM. Prefix tree term is used for clear understanding that the data index is prefix tree of all the start keys of existing partitions. The key values are stored in key order (partially sorted) in partitions and prefix tree index keeps the sorted order of the start key of each partition. This way data can be read in key order by following the prefix tree index node order thereby retrieving partitions in key order. Each data partition is partially sorted and can be fully sorted in the partition before executing range query. It is not required to fully sort the data for single/multiple key value lookup. As illustrated in FIG. 4A all the key values lexicographically between keys aba and abactinal are stored in the first partition 406 and it defines the key range for this partition. So insert or look up of any key that is lexicographically between these keys will go to this partition by searching it through the prefix tree.

Adaptive radix tree as described in the mentioned research paper is used for the implementation of adaptive prefix tree with some configurable customizations that could optimize cpu or memory consumption. More node sizes would reduce memory footprint but will increase CPU utilization since there will be more frequent conversion of one node type to another. ART paper uses node types with maximum sizes 1, 4, 16, 48 and 256. Adaptive prefix tree can have node types with flexible maximum sizes depending upon storage engine configuration e.g., 1, 3, 7, 16, 32, 64, 256 to reduce memory footprint or 1, 7, 16, 62 and 256 to reduce CPU utilization or such variations that improves performance or memory usage for the expected workload based on the application requirements. In English language there are 26 letters lower case, 26 letters upper case and 10 digits so there are 62 characters that are usually possible in the key. So node 48 from the original paper can be changed to 62 keeping the same functionality while binary search can optimize look up in the node with maximum size 4 or 7. SIMD operations can speed up searching through nodes with maximum sizes 16, 32, and 64 whenever utilized and if there is a provision to utilize SIMD instructions. Techniques like path compression, lazy expansion specified in the paper are utilized to improve space utilization. Further the leaf node 900 is not required to store the entire key, the key for the leaf node is generated with the help of root to leaf node path as the tree is traversed. Also header node size can be reduced by packing bit presentation of type of node and number of children.

Figure 3:
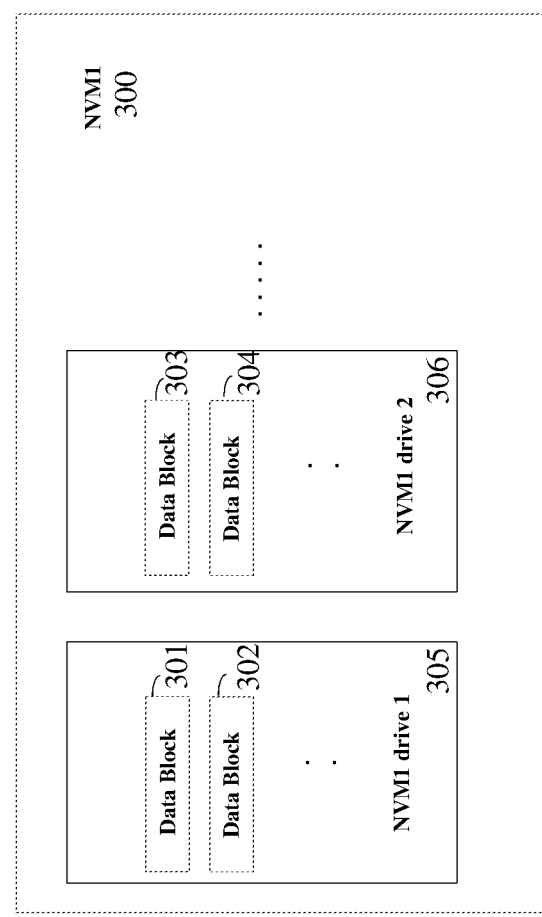
FIG. 3 is a block diagram of non-volatile memory level NVM1 depicting how data blocks of that particular NVM1 are placed on multiple drives of same non-volatile memory NVM1.

There are multiple prefix tree indices used at most one for each non-volatile memory level in the memory hierarchy in the data store like NVM1 Index 107 and NVM2 index 108 and so on. Data blocks on NVM1 memory can be placed on one or plurality of drives of the same memory level type NVM1 as shown in FIG. 3. As shown the NVM1 drive 1 305 host many data blocks such as 301, 302. Data blocks 303, 304 of NVM1 are on another drive 2 306. The address of the block is stored as 1001 in the index leaf node 1000.

One prefix tree 106 is used for referencing the start key of data buffer partitions. At most one prefix tree is used for referencing the start key of data blocks on each of slower non-volatile memory like flash memory, RRAM, PCM, hard disk or 3D XPOINT etc. shown as NVM1 slower memory 109, NVM2 slower memory 114 in the embedded data store 103. Data blocks on non-volatile memory differ from data buffer partitions in the way they each store data and retrieve data. The data blocks are immutable. The data inside the data blocks is fully sorted in key order. The size of data blocks is specified in the configuration. Appropriate data block size can be specified in the configuration. Ideally data block size should be equal to the erase unit size (superblock/erase block) on block based memory type like flash memory to minimize write amplification. It can be chosen in partial or multiples of the same for block based memories. Further same data block size can be chosen for all memory types to simplify moving of data from faster memory to slower memory to improve CPU utilization.

FIG. 4A is a diagram of space optimized adaptive prefix tree elaborating how referencing to data buffer partition 406, 407, 408 in fast memory like DRAM works. All in-memory data buffer partitions 105 combined together with the data buffer prefix tree index 106 is the data buffer for storage engine. Data buffer helps to buffer the recent inserts/updates/deletes and to serve lookups on the recently inserted/updated/deleted entries in the data store.

Each partition in data buffer contains key-value pairs that are recently inserted or updated or deleted. Update operation is a special insert operation where the key value is inserted and during one of the merge operation the new value for the same key will overwrite the old value or multiple values will be kept with timestamp to support multi version concurrency control. Value can have multiple columns 1101, 1102 and 1103 as column for keys, timestamp and values respectively. The keys 1104, 1105 from keys column 1101 have associated column values 1106, 1107 with timestamp specified in column 1102 to support flexible schema and multi-version concurrency control. Column key would be length of key followed by key and column value would be length of the value followed by value.

Partition contains these lists—Sorted list of keys 409, 411, 413: A larger sorted list of keys with value offset. Log-structured keys list 410, 412, 414: A smaller log-structured list of keys with value offset. Log-structured list of values 510: Log-structured list of values (value length followed by value).

Partition has following variables—Memory offset variable that keeps track of the memory offset of the next available byte in the log-structured list of values so that the next value length, value can be appended at that specified byte. Index variable 500 for log-structured keys list that keeps track of the next available array index location for inserting newly arrived key of the key value. Old index variable for log-structured keys list that keeps track of the old index position at which merge operation of log-structured keys list with sorted keys list was performed.

The properties of these lists like size of the lists are specified in the configuration file. The log-structured list of values can be stored on byte-addressable non-volatile memory to allow larger data buffer size. In this case, the key is also stored along with values as key length 701, key 702, value length 703 and value 704. This method of storing keys along with values on byte addressable non-volatile memory avoids double writing to write ahead logs since data is directly buffered to persistent non-volatile memory. WAL is not required for recovery in this case.

The length of the key is specified in the configuration which provides the maximum predicted key size in the data store. Fixed amount of memory allocation for a key is used for constructing these in-memory lists so they can be constructed as simple arrays for log-structured keys list 410 and dynamic array data structure for sorted list of keys 409. Larger key size for newly inserted key value data can be accommodated by creating new log-structured keys list and sorted keys list arrays with new larger size of key for the data partition which holds that key range. This does not require modifying any other data buffer partition or data blocks.

Memory is pre allocated for log-structured keys list as array of specified size in configuration when new data buffer partition is created. Data structure for a key in it has first few bytes to denote length of the key 501 as specified in the configuration then the actual key 502 and then reference to the value 503. The index 500 variable denote the next available position to append the key in the log-structured keys list. This index will be updated as a Compare And Swap CAS operation for thread safety.

Figure 7:
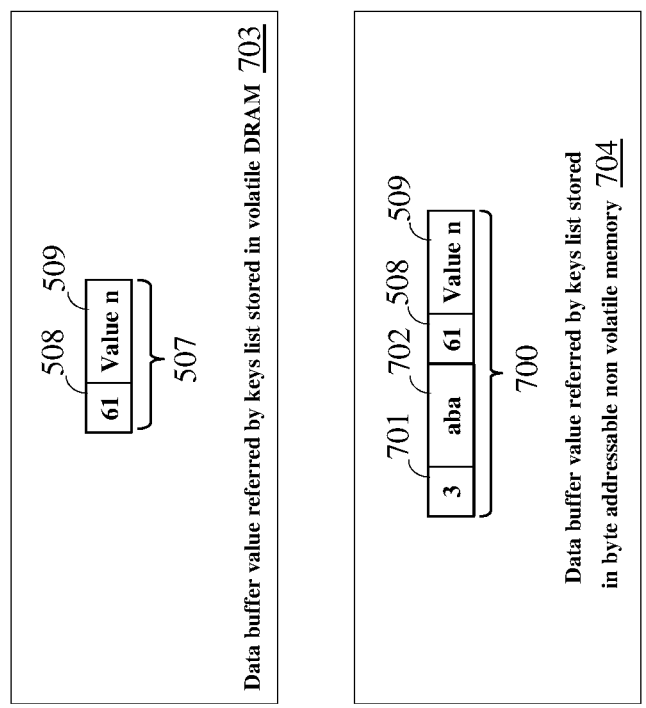
FIG. 7 is a diagram depicting how key values data is buffered directly on byte addressable non-volatile memory without storing values in log-structured values list or on memory.
Figure 8:
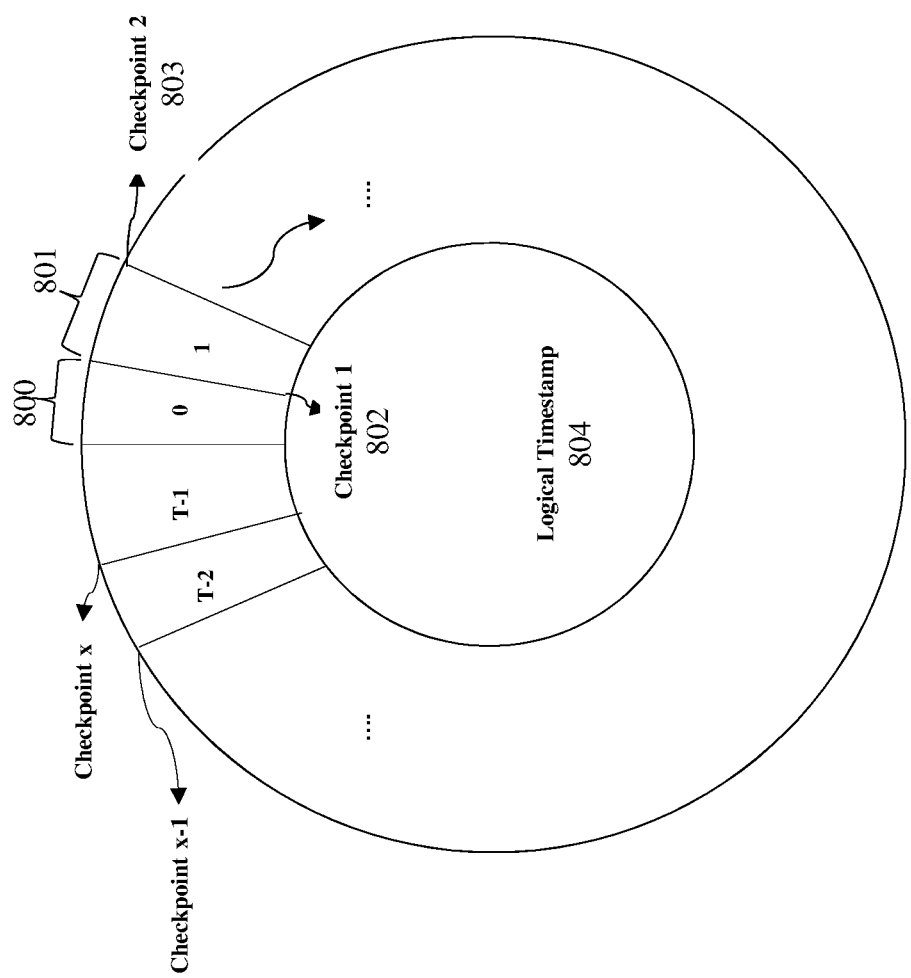
FIG. 8 is a block diagram of checkpointing mechanism
Figure 9:
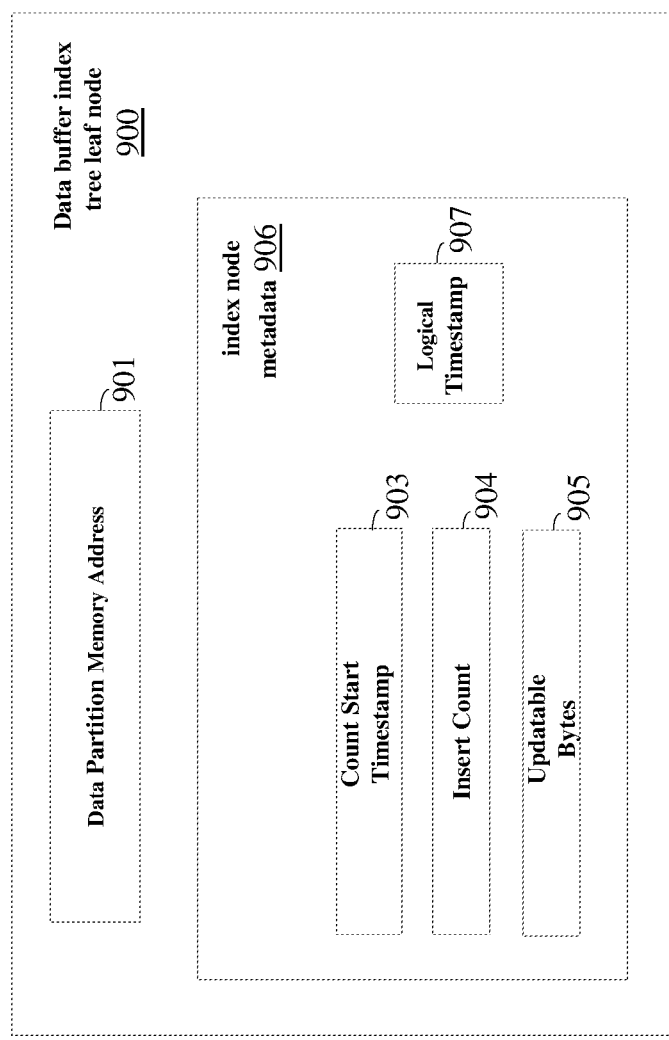
FIG. 9 is a block diagram of data buffer index tree leaf node depicting metadata information stored.
Figure 10:
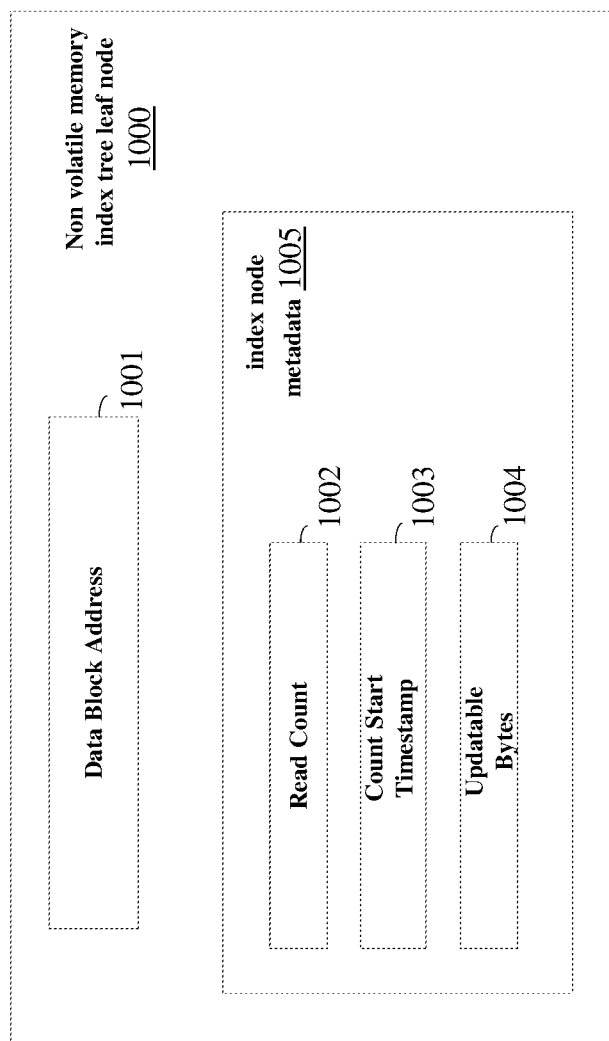
FIG. 10 is a block diagram of prefix index tree leaf node for non-volatile memory depicting metadata information stored.
Figure 11:
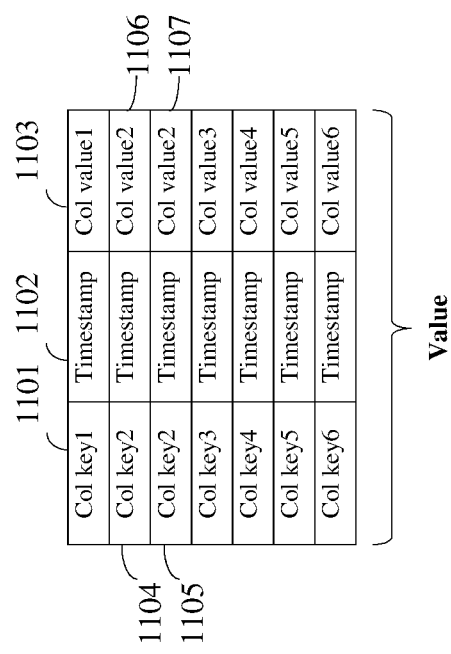
FIG. 11 is a diagram that depicts how a value stores multiple key values internally in separate column for key, value and timestamp.

Memory is preallocated for log-structured list of values 510 based on the configuration. Partition has memory offset variable that specifies the byte location in this log-structured list of values where next inserted value will be written. This list can be stored in byte-addressable non-volatile memory where key length 701 and key 702 is stored before value length 703 and value 704 for each value in the list 510. So instead of storing value like 507, it is stored like 700 as shown in FIG. 7.

Figure 13:
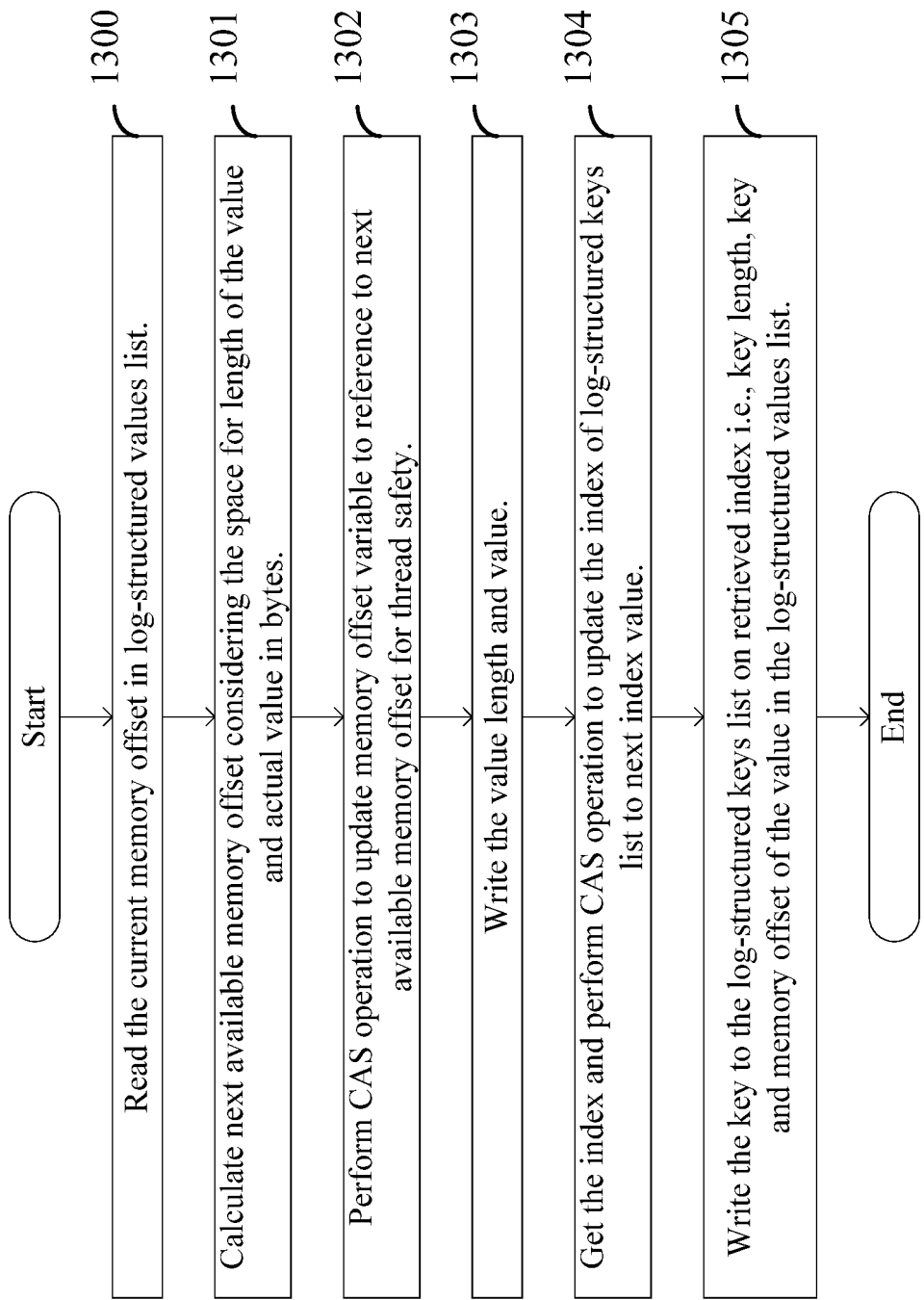
FIG. 13 is a flow diagram for inserting key value to data partition with log-structured values list.

FIG. 13, is a flowchart of the methodology used to insert a key value in the data buffer partition. The current memory offset in log-structured values list is read 1300. Then next available memory offset considering the space for length of the value (2 bytes but depends on maximum expected value size in configuration) and actual value in bytes is calculated 1301. CAS operation is performed to update memory offset variable to reference to next available memory offset for thread safety 1302. The value length 508 and value 509 is written at the memory offset of log-structured values list 1303. The index 500 is retrieved and CAS operation is performed to update the index of log-structured keys list 1304. At last the key is written to the log-structured keys list on retrieved index i.e., key length, key and memory offset of the value in the log-structured values list 1305.

The log-structured values list 510 help us to speed up the retrieval of range of key values. It saves memory by reducing the size of offset to locate the value for the key. At the same time the in-memory garbage collection becomes simple and fast. The downside is that good amount of memory is preallocated for each partition for this list. The memory footprint is quite high with this approach.

Figure 6:
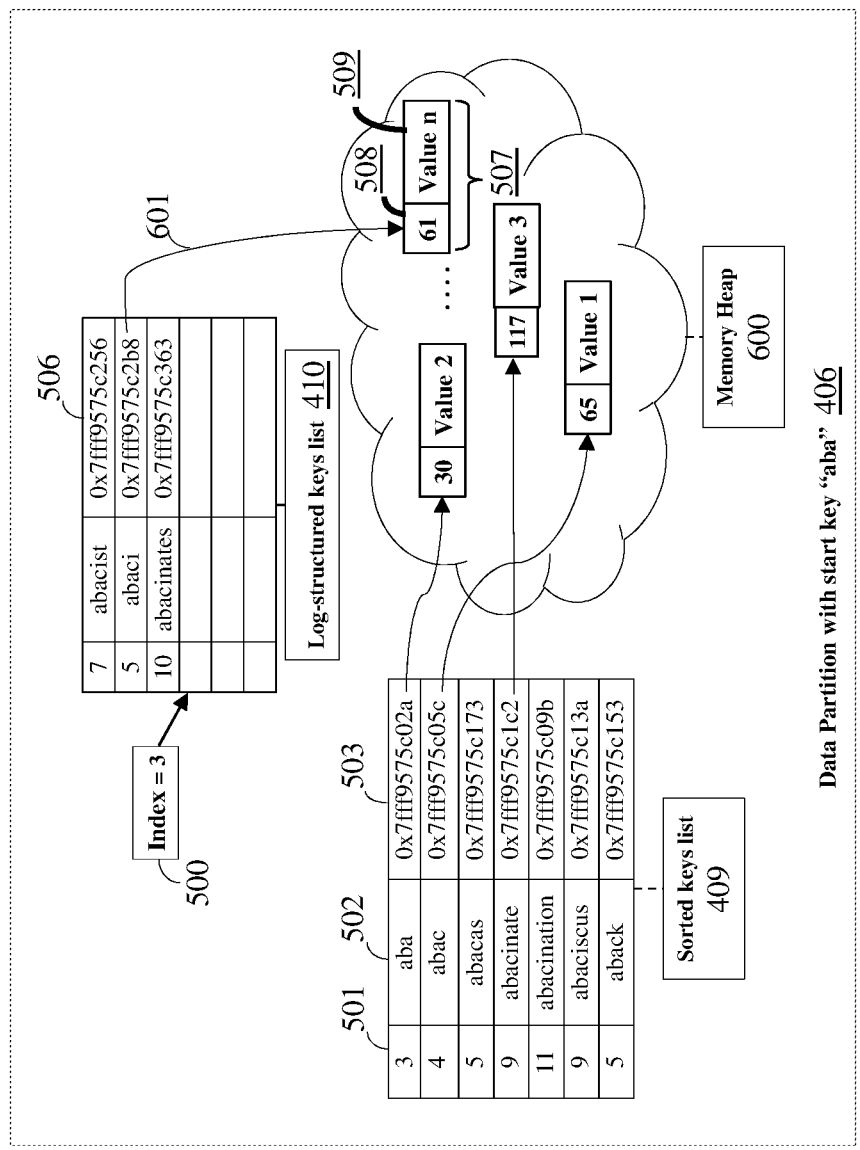
FIG. 6 is a block diagram of elaborated data partition without log structured values list storing direct references to values on memory heap
Figure 14:
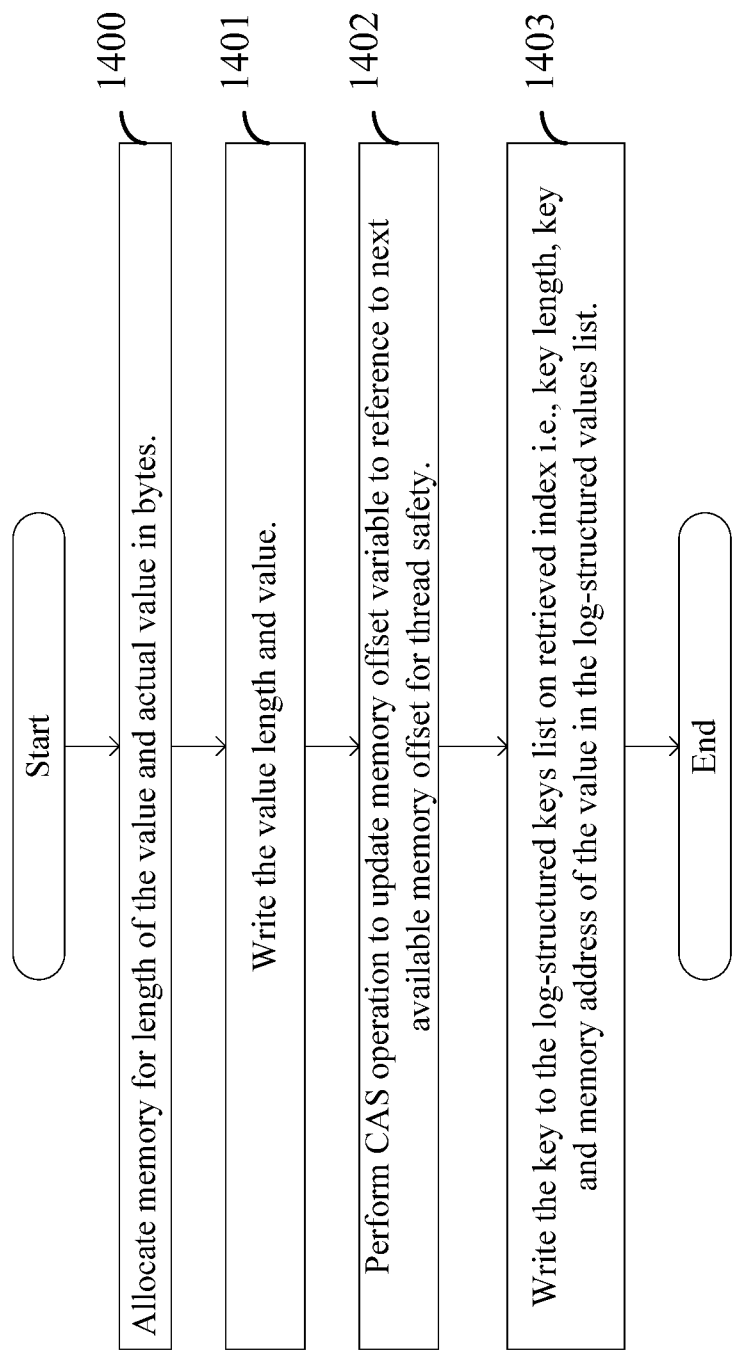
FIG. 14 is a flow diagram for inserting key value to data partition without log-structured values list.
Figure 15:
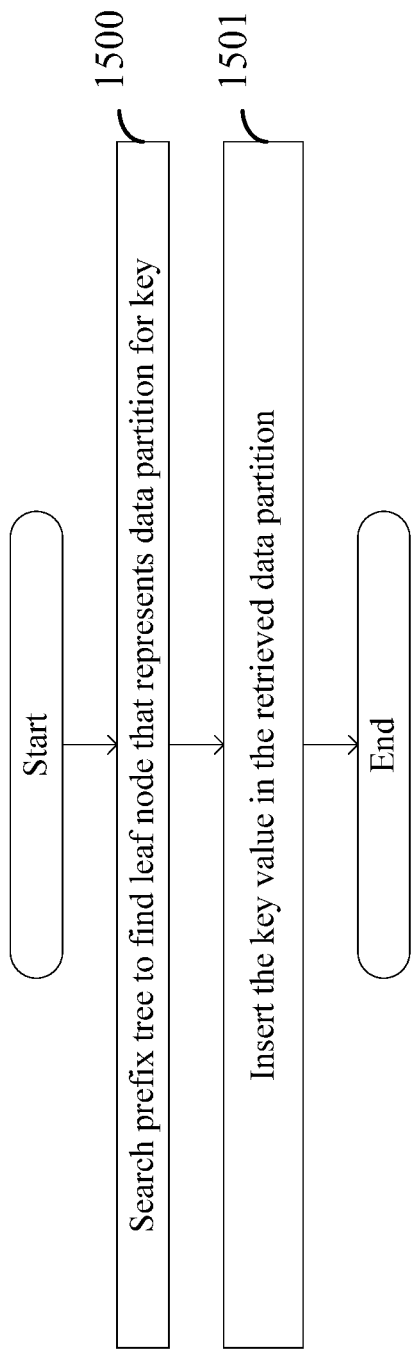
FIG. 15 is a flow diagram for inserting key value to data store.
Figure 16:
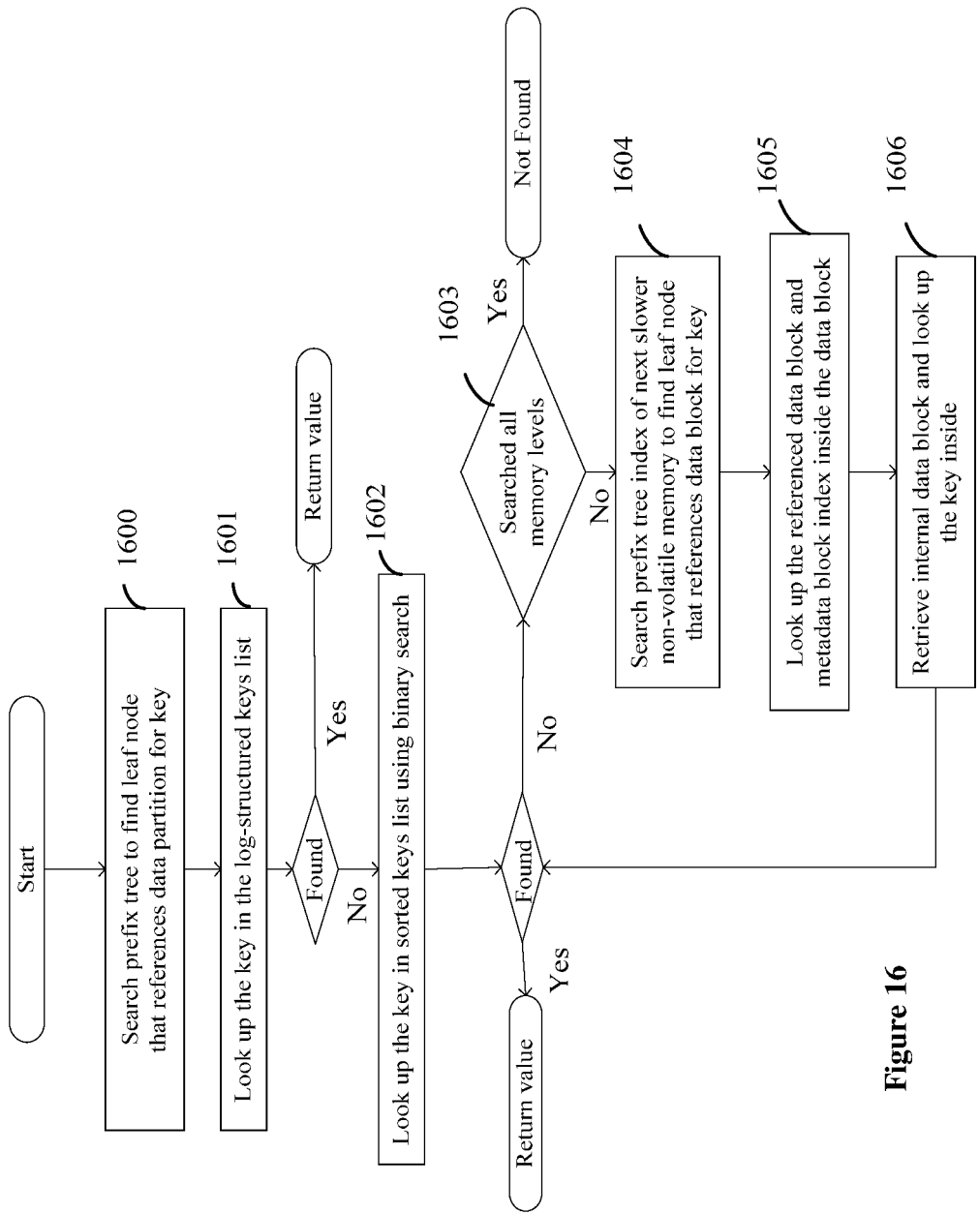
FIG. 16 is a flow diagram for looking up a key in data store.

To reduce the memory footprint alternative approach can be chosen that does not use log-structured values list without affecting performance much as shown in FIG. 6. Wherein values are stored directly on to the fast memory heap like DRAM 600 and the references to the values like 506, 503 are stored in the log-structured keys list 410 and sorted keys list 409 instead of the values offset in log-structured values list. In this case FIG. 14 depicts the flowchart for inserting key value in the data buffer partition without use of log-structured values list. It first allocates memory considering the space for length of the value 508 (2 bytes but depends on maximum expected value size in configuration) and actual value 509 in bytes 1400. Then writes the value length and value 1401. The index 500 is retrieved and updated to the next value (add 1 to index variable since it is list index) for log-structured keys list using CAS operation 1402. The key is written to the log-structured keys list on retrieved index i.e., key length, key and memory address of the value 1403.

Configuration file has a threshold for triggering the merge of log-structured keys list with sorted keys list. e.g., if threshold is 80% then whenever log-structured keys list is more than 80% full the unsorted log-structured keys list is merged to sorted keys list using described methodology.

When the data is merged from log-structured keys list to the sorted keys list, a new sorted keys list is created as a copy of sorted keys list. A write lock is acquired on original sorted keys list at the same time concurrent read access to the data in the sorted keys list is allowed. When the new sorted keys list is merged with log-structured keys list, original sorted keys list is updated to point to new sorted keys list and write lock is released. Old original sorted keys list can be deleted using reference counting. There could be more than one old sorted keys list at a time based on reference counting.

Figure 17:
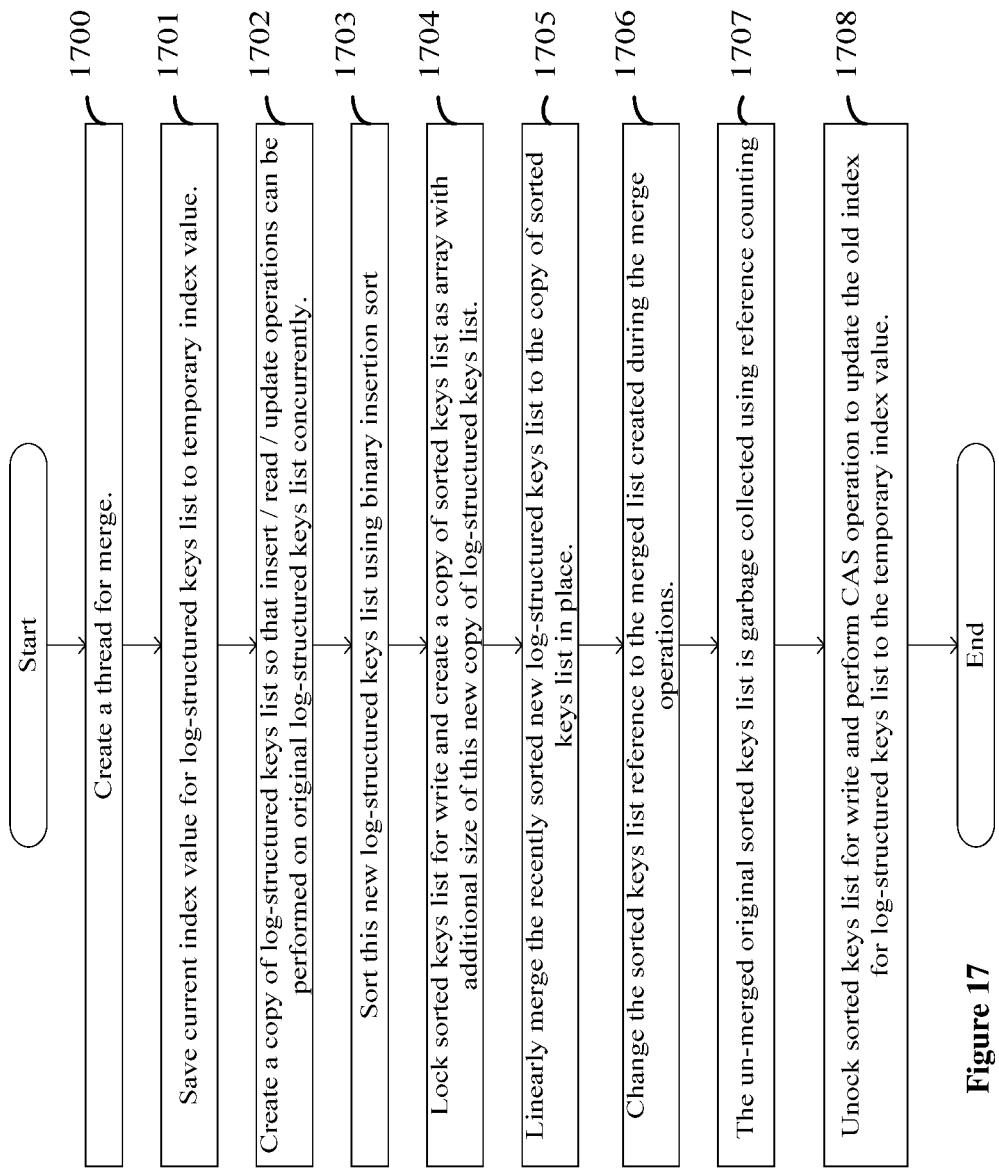
FIG. 17 is a flow diagram of merging log-structured keys list with sorted keys list in the data partition.

FIG. 17, is a flowchart of the methodology to merge the recently added keys to the log-structured keys list with sorted keys list. In this methodology a thread is created for merge operation 1700. Current index value for log-structured keys list is saved to temporary index value 1701. A copy of log-structured keys list is created so that insert/read/update operations can be performed on original log-structured keys list concurrently 1702. This new log-structured keys list is sorted using binary insertion sort (less than 12 elements with memory movement operations memmove( ) in C or System.arraycopy( ) in Java etc.) or quick sort or combination of both 1703. The sorted keys list is locked for write and a copy of sorted keys list is created as array with additional size of this new copy of log-structured keys list 1704. The recently sorted new log-structured keys list is linearly merged to the copy of sorted keys list in place 1705. The sorted keys list reference is changed to the merged list created during the merge operations 1706. The un-merged original sorted keys list is garbage collected using reference counting 1707. Unock sorted keys list for write and CAS operation is performed to update the old index for log-structured keys list to the temporary index value 1708.

This merge operation's amortized time complexity is linear considering the data inside the partition since sort happens on small log-structured keys list which will utilize processors cache and merging two sorted lists is linear.

In case log-structured keys list gets 100% full, insert will fail and insert will be retried with very small delay for few times until it is successful. The number of retries and delay are specified in the configuration file. Binary exponential back off will be used for increasing delay between the retries.

Sequential insertion can be specified in the configuration. For sequential insertion of keys, the log-structured keys list itself is the sorted keys list so merge operation and separate sorted keys list is not needed. Binary search lookup for key can be served from the log-structured keys list. Log-structured list of values can be beneficial since split and merge of the log-structured values list is not needed and only one log-structured values list will be preallocated for sequential insertion.

For insertion of key value in the storage engine we first perform lookup for the key in the prefix tree and find the leaf node 900 that represents the partition where this key value belong that is the leaf node with largest possible key less than the insertion key 1500. Then key value is inserted in the appropriate partition 1501 using the memory address 901 from the leaf node. As the log-structured keys list gets above the threshold, it is merged with the larger sorted list of keys. The sorting and merging happens in another thread concurrently with insert/read/update/delete operations. If there are multiple entries for the same key in the unsorted list, the older values column key 1105 and column value 1107 can be stored with timestamp with the latest value.

For key lookup the leaf node with largest possible key less than the lookup key is searched in the prefix tree 1600. This leaf node has the address of the partition where the lookup key lies lexicographically in the key range of the partition. Then we look up in the partition's log-structured keys list since that holds the latest mutations to the partition 1601. The look up is performed backward from index location till the old index location in the log-structured keys list. Keys with index less than old index are in sorted keys list. If key is located then the corresponding value offset/address is looked up and value is returned. If it is not present then binary search is performed in the sorted list of keys to retrieve the value offset/address 1602. If the key is not found in any of these lists then key is not found in the data buffer and lookup in the data buffer is done. Then look up is performed 1604 in the next slower non-volatile memory NVM1 300 in the memory hierarchy by similarly looking up the key in the prefix tree for that slower non-volatile memory NVM1 300 in the memory hierarchy. This prefix tree nodes have references to the data blocks on NVM1 300. It looks up 1605 the metadata (block index 1205) in the data block to retrieve the internal block 1606 that contains the key value. It scans the internal block and return the value. If the key is not found then it checks if look up has been performed on all memory levels 1603. If next non-volatile memory level is available, similar search is performed for that non-volatile memory data. If all memory levels have been searched then key not found is returned. The NVM1 300 metadata (block index 1205) may be a serialized skip list or serialized adaptive prefix tree like clustered index in log-structured merge tree based storage engines.

Range query is performed similarly by looking up the start key and then key values are sequentially read until the end key of the range. Separate range queries are executed in each memory hierarchy and all the key values are merged to generate the result. When range query is performed in the data buffer the affected partitions are fully sorted before retrieving the key values in the range.

Multi-get operation is performed by looking up each key in parallel using multiple threads. Multi-put operation is performed as multiple put operations in parallel using multiple threads. Multi-put can also provide transaction semantic like either all put are successful or none. In the case of rollback delete operations are performed for successful put operations which are part of multi-put operation.

For deletion of key, key is appended in log-structured keys list with NULL pointer for its value so during the later merges with data block/s the old key values will be deleted.

Based on space threshold specified in configuration for the data buffer, the data buffer partitions from fast memory like DRAM merges with data blocks on next memory in hierarchy. Similarly the data blocks from faster memory in hierarchy merges with data blocks on next memory in the hierarchy based on space threshold specified in configuration.

Design of index is crucial for faster retrieval of data. Non-volatile memory such as flash memory capacity is increasing and would reach into tens of terabytes. Usually index data structures tends to occupy 2% to 10% of the data size based on the individual key value size. Smaller the value size larger the index size since it needs to hold more references to values.

When data store/database application needs more indices like secondary indices then the total index size generally grows beyond 25% of the total data size. The data on the server machine can be few terabytes since non-volatile memory is reaching tens of terabytes of capacity. The index for this data will be in terabytes for a single server machine. It is very costly and probably not feasible today to keep this index in DRAM memory so pretty much all of the today's storage engine stores index in flash or disk drives. Index needs to be updated quite often when the data is written to the storage engine unless a log-structured merge tree is used for storage engine. This index update causes too much write amplification based on the flash memory properties. The index as shown in FIG. 4A is designed to fit entirely in DRAM by using adaptive prefix tree that has extremely low memory footprint and allows to do all sorts of storage engine operations like lookup key, write key-value, scan key ranges, delete key-value so that complex queries like SQL or user defined queries UDF can written on the top. Also transactions, multithreading, MVCC, recovery can be supported. Storage engines today store the index in various data structures like Btree, CSB+ Tree, Skiplist, T-tree etc. Some storage engines use hashtable while LSM based storage engine use skiplist or btree based clustered index. All these storage engines today stores the index on persistent media like flash memory or hard disk drive. As opposed to that the invention describes that the entire tree index/indices are stored in fast memory like DRAM to avoid write amplification for index updates.

This index is written to non-volatile memory periodically in the form of delta. The adaptive prefix tree index has extremely small memory footprint and it is serialized and persisted in non-volatile memory. The delta can be written as batch of series of update/delete/put operations on index. Periodically the tree is de-serialized and delta batches are replayed to construct the most recent adaptive prefix tree index. Alternatively to optimize on CPU utilization, entire index can be serialized and persisted without locking the index tree periodically and delta can be taken since the beginning of the serialization operations on this index and persist deltas so that entire index for the current state of storage engine could be recovered in the event of crash using persisted entire old index and deltas. Any non-volatile memory can be used to store this index and its deltas.

Total bytes used by the data in each partition is calculated from memory offset value in log-structured values list. When the value has very large length higher than a threshold specified e.g., 25% of the partition size we just store that value separately allocating memory for the same and the size of the value is included in the total used bytes for the partition.

In the case of the partition without log-structured list of values, data buffer management process becomes quite simple. In this case as the total number of keys in sorted keys list grow more than threshold, the data partition needs to be rearranged or split. In this case the splitting of the partition would be fully sorting the partition and simply moving the latter half of the sorted keys in the new partition. New partition is added to the prefix tree index. Since the values are the references, there is no need to move them. There is no need to insert each key in new partition while moving. memcopy( ) can be used to speed up moving of the keys. Similarly rearranging partition would require cleaning up deleted keys and moving some keys that may change the start key of partition and prefix tree index needs to be updated to reflect the start key for that partition.

In the case of the partition with log-structured list of values, data buffer management process rearrange the partitions as data occupies more space than threshold in the partition. As the values list occupies more than partition value list size percentage threshold, the data partition needs to be rearranged or split. This process takes partition space utilization in to account and take appropriate number of partitions and splits them or rearranges data in those partitions. Data buffer management process aims to achieve data buffer partition utilization to be between certain buffer management threshold ranges e.g., 60%-75% of the total partition size. The exemplary methodology is specified below to achieve this but it is just one such methodology. A more sophisticated and self-learning buffer management methodologies can be developed to manage data buffer.

When the data occupies more space than threshold in the partition's log-structured values list, valid data size is taken in to consideration. If valid data in the partition is less than lower threshold specified for single partition data rearrange e.g., 75% then data is rearranged in the partition itself. If the valid data is greater than higher threshold specified for single partition data rearrange e.g., 120% then data is split in to two new partitions and old partition is deleted. The prefix tree is updated accordingly by removing the start key of the old partition and adding start keys of the new partitions created with the address to their corresponding partitions.

If the valid data size is more than 75% but less than 120% then next partition in order is taken (if next does not exist then previous partition) and valid data size is checked for these partitions together. The valid data sizes from these partitions are added and average is taken. If average is less than lower threshold specified for multiple partition data rearrange e.g., 75% then valid data is rearranged such that about half the valid data from both partitions is inserted in first new partition in sorted order and remaining in the second new partition. The prefix tree is updated accordingly by removing start keys of both old partitions and inserting start keys of newly created partitions. If average is greater than 90% then the valid data in three new partitions is rearranged in such a way that first new partition will have about a third of valid data in sorted order and sorted next third in the second partition and remaining sorted third in the last partition.

If the valid data size is between 75% and 90% then one more partition is checked that is previous partition in order (or next if previous does not exist). The average is calculated for valid data in all these partitions. If the average is less than 75% then valid data is rearranged in these 3 partitions in sorted fashion as discussed earlier and the prefix tree is updated. If it is greater than 75% then the valid data is rearranged in four new partitions in sorted fashion like in previous rearrangement.

Overlapping prefix tree index nodes from data buffer index with other prefix tree indices of non-volatile memory data blocks will have the information of number of new bytes would be written in each data block key range there by amount of updatable data bytes can be calculated in the data block. e.g., Data block's key range (start key of current data block till the start key of next data block in order) can be noted in the prefix tree for data block's non-volatile memory and correspondingly get insert count operation on the same key range can be performed on the data buffer prefix tree. This get insert count operation will look up the key range in the data buffer and return the summation of insert count 904 from all data partitions within that range. The get insert count operation can be enhanced to get updatable bytes operation by storing the value length 1800 in the keys list along with value offset/memory address as shown in FIG. 18. Value length is stored in both log-structured keys list and sorted keys list. This will help calculate updatable data bytes when key range does not include entire partition. When key range includes the entire partition the number of updateable data bytes 905 are already tracked in the data buffer index leaf node as 900. The number of updatable bytes for the key range is the summation of updatable bytes from all partitions within this key range including updatable data bytes when key range does not include entire partition. This mechanism of tracking or calculating updatable data bytes for particular data block is very useful for memories with block erase properties.

Multi-stream divides the flash memory in to different regions. Each region contains few flash chips arranged in channel, way and die fashion and only one stream writes to that region limiting or avoiding stripping of the writes of data over many flash chips. Address Translation Layer ATL is chosen or customized in such a way that a data block is not written to multiple units of garbage collection i.e., erase unit or superblock. This can be achieved developing/using multi-stream approach where each stream will only write to flash chips on single superblock or erase unit. It would be ideal to have data block size equal to the superblock/erase unit size and all data inside data block would go to single superblock/erase unit. Flash memory write amplification is completely avoided in this case for these data block.

For claiming the space of deleted data blocks on non-volatile memory, custom garbage collection mechanism can be created that access prefix tree index for that non-volatile memory data blocks. Erase unit or superblock is the most granular unit of data that can be erased in flash non-volatile memory and this concept is used for few other block based non-volatile memories.

Erase unit or superblock can contain multiple data blocks. When data blocks are guaranteed to be written to only one superblock or erase unit. The number of updatable data bytes for superblock or erase unit would be summation of updatable data bytes 1004 from all data blocks it has. This is very granular yet very simple way of identifying which erase unit or superblocks to target for garbage collection and since all these updatable valid data bytes 1004 are already tracked in data block index leaf nodes 1000 metadata 1005. A maximum priority queue of these erase units or superblocks with a property that root node will have maximum number of updatable data bytes making it ideal block for garbage collection. This will help save lot of write amplification since it helps precisely identifying erase unit/superblock with maximum amount of updatable data to be updated in the data blocks it contains. Garbage collection process can target these blocks first in order to minimize the write amplification. Garbage collection is triggered for the non-volatile memory when data on the memory crosses threshold specified in configuration and data can't be moved to slower non-volatile memory in the hierarchy. All the affected data blocks will be merged with data buffer and stored on non-volatile memory.

Figure 12:
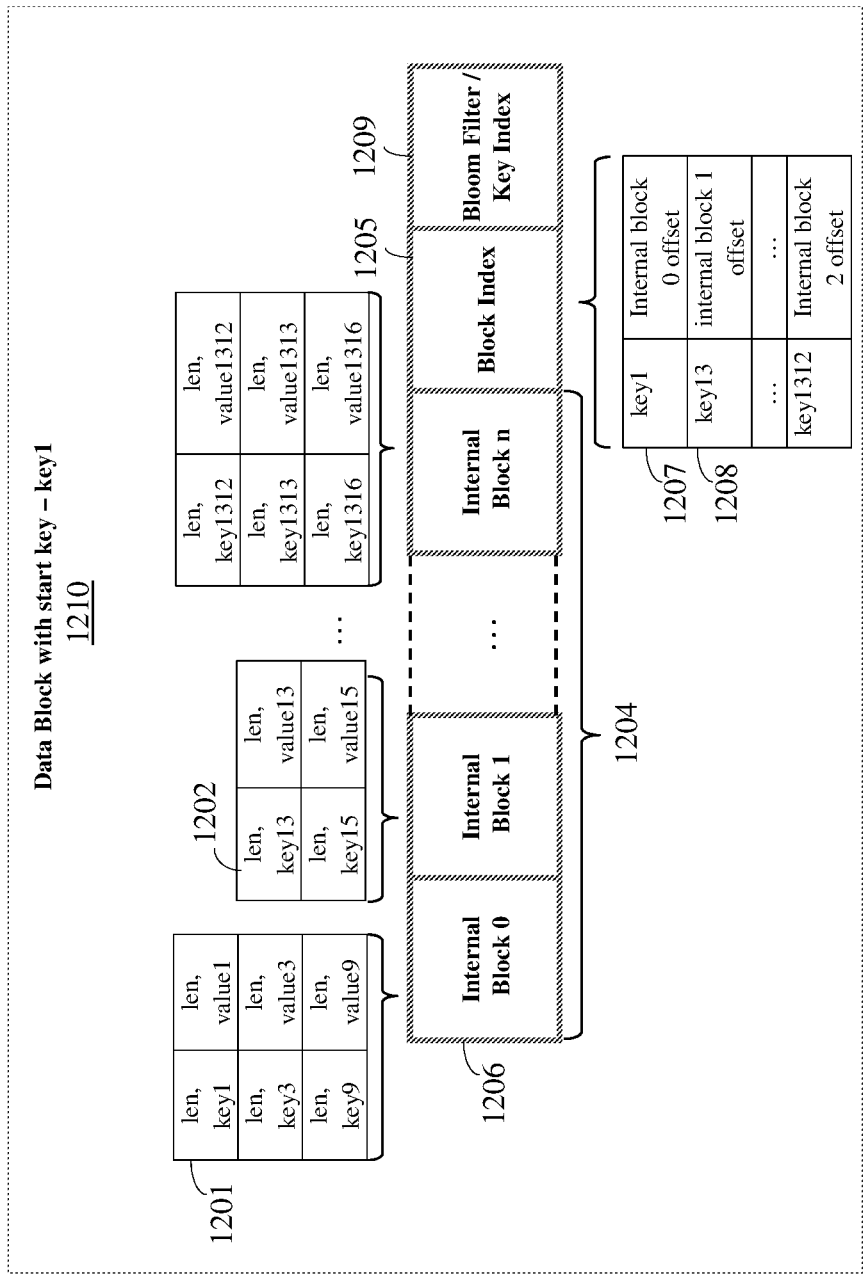
FIG. 12 is a block diagram of immutable data block.

Data partitions from data buffer needs to be written to next non-volatile memory in the memory hierarchy as size of data in data buffer grows beyond threshold specified size in the configuration. The data partitions need to be identified in order to create immutable data blocks 1210 as shown in FIG. 12. Similarly the data blocks from faster non-volatile memory in hierarchy are merged with data blocks in next non-volatile memory in hierarchy using the finding non-dirty data block mechanism.

This embodiment describes how to find dirty data block in the first level non-volatile memory in the memory hierarchy. Each data block has a key range that indicate key values are within that range are only written in this data block for that non-volatile memory. The mechanism to calculate updatable data bytes for data block will be used here. The updatable data bytes is the measure of dirtiness of data for data block. The maximum priority queue of data blocks with max-heap property of number of updatable data bytes will give most dirty data blocks. These blocks will be merged with the overlapping data buffer partitions from the fast memory like DRAM. The memory occupied by data copied from data buffer partitions will be reclaimed. Finding data block in faster non-volatile memory to move it to slower non-volatile memory in the hierarchy should be accomplished to move the data blocks to reclaim space in faster non-volatile memory as it crosses the configurable threshold. Each leaf node of prefix tree index for non-volatile memory has read count 1002 that counts how many times read is performed on the data block. The maximum priority queue of read count can help us identify data blocks that can be added to the block cache which is separate cache of data blocks kept in fast memory like DRAM memory for speed. The minimum priority queue of read count can help us identify data blocks that can be moved to the slower non-volatile memory in the hierarchy. The entire block will be copied to the next slower non-volatile memory in the hierarchy and prefix tree index will be updated to add entry for this block. Then index of faster non-volatile memory will remove that entry and delete the data block to reclaim space. This methodology is performed only when the faster non-volatile memory crosses the configurable memory threshold.

Count start timestamp 903, 1003 is used to reset insert count and read count periodically.

When values or log-structured values list is not written to byte addressable non-volatile memory, write ahead log (WAL) and timestamp based logic is used to guarantee the persistence. Logical timestamp 804 is created while writing to WAL. T number of timestamps are created and will start with 0. Once about D bytes of data is written to WAL 800, it will put demarcation in WAL for the end of logical timestamp consider 0. Again after writing about D bytes 801, it will put another demarcation in WAL for end of next timestamp 1. This will continue till T−1 and will reset to 0 after that. The checkpoint mechanism guarantee that all data logically older than or equal to C [0, T) timestamp is persisted to non-volatile memory. C logical timestamp is chosen programmatically by checkpoint logic which is the last logical timestamp. 802 indicates checkpoint 1 at the end of logical timestamp 0. 803 indicates checkpoint 2 at the end of logical timestamp 1. D and T will be specified in the configuration. Logical timestamp is assigned to the partition when it is created or last checkpointed. This can be stored in the prefix tree index leaf node metadata 906 for each partition in the data buffer as 907. This mechanism will look up in data buffer prefix tree index and find out which partitions timestamps is less than checkpoint logical timestamp and those partitions will be forced to be merged in flash memory partitions. Ideally none of the data buffer data should be merged with flash memory data using this checkpoint approach but this mechanism will make sure the data is persisted to flash memory with consistency. Checkpoint mechanism also provide a way to create a snapshot. WAL can use super-cap capacitor backed DRAM memory if available to batch few writes before it writes to non-volatile memory. Batching of writes in this case is equivalent to database group commit concept. Inserts will work very fast in this case.

After identifying data buffer partitions that needs to be persisted, this data is merged with the data blocks in next non-volatile memory in the hierarchy if there is an overlap of data. Prefix tree index for data buffer and non-volatile memory is used to find if there is overlap. If there is no overlap then immutable data blocks are created and are written to next non-volatile memory in the hierarchy. If there is overlap then data is merged linearly since both partition and data block are sorted. Sorted keys list of data partition is locked only during overlapping data partitions and data blocks are merged and written to the non-volatile memory. Concurrent insert/update/delete operations can be still performed on the data partition until log-structured keys list is full during the merge between data partition/s and data block/s. Concurrent read operations can be performed.

When new partitions are created for rearranging partitions data, the old partitions are deleted using the reference counting, so old partitions can still complete ongoing read operations.

The data blocks are compatible to SSTable defined in Bigtable research paper "Bigtable: A Distributed Storage System for Structured Data" so that all the approaches to distribute the data in distributed system can be used while the local read/write data paths are optimized to take full benefit of memory hierarchy and properties of each memory in the memory hierarchy. These data blocks have key based clustered index. Simply SSTable can be used as data blocks. The data blocks can be further optimized.

Data blocks are compatible to SSTable with optimizations to speed up the read. Since SSTable is compatible with data block available SSTable implementation can be used for data block. Further distributed processing like map-reduce, Spark RDD's action and transformation will be supported for data block since map-reduce can be directly performed on SSTable data and RDD's can be created loading data from SSTable.

Similar to SSTable, the data block provides a persistent, ordered immutable mappings from keys to values, where both keys and values are arbitrary byte strings. Operations are provided to look up the value associated with a specified key, and to iterate over all key/value pairs in a specified key range as the data is ordered. Internally, each data block contains a sequence of internal blocks 1206 that constitutes actual data 1204 (typically each block is 64 KB in size, but this is configurable). All internal blocks that constitutes data can be compressed to save space. A block index 1205 (stored at the beginning/end of the data block) is used to locate these internal blocks; the index is loaded into memory when the data block is opened. To optimize data block adaptive prefix tree can be used to build the clustered block index 1205 for internal blocks. This index is built using the start key of each internal block 1207, 1208 etc. which are start keys 1201, 1202 of internal blocks 0, 1. For each key value in the internal block, len 1201 denotes the length of key or value associated with it. Using path compression and lazy expansion techniques more space can be saved. The tree index is serialized and stored along with the data in the data block. For looking up value for an input key in the data block, block index is looked up to find the internal block. The internal block can be scanned linearly for retrieving the value for the key. The adaptive prefix tree saves space for internal block index so it would occupy less fast memory like DRAM when loaded. That would allow a lot of internal block indices to be cached in fast memory DRAM or other available. Key Index is prefix tree index for all keys in the data block can be used to avoid unnecessary scan if key is not present. Further each key in the key index will store its value offset within internal block so that after locating the internal block through block index, value will be looked up directly without scanning the internal block thereby saving significant amount of cpu utilization. Bloom Filter can also be used for this purpose. Either key index or bloom filter will be used. Key index or bloom filter 1209 is to speed up the read at the expense of memory and can be cached in faster memories.

Write ahead logs can be written to bunch of hard disk drives or faster non-volatile memory configured in RAID 1 stripping over few disks.

Log-structured merge tree based storage engines like LevelDB does the merge (compaction) of newly written data with old data in level fashion taking size of the data chunk SSTable in to account. This way it may choose big data block with barely 5% of its data is modified to merge with newly written data in data buffer. This will cause 20× write amplification.

For block based non-volatile memory with multi-stream like flash memory, insert count can be added to each non leaf node in the prefix tree index. The data blocks under the nodes with higher count as more frequently updated blocks. We can differentiate hot and cold streams based on most frequently updated to least frequently updated data blocks. Hot stream will write to superblock/erase unit that has very frequently updated blocks while cold stream will write to superblock/erase unit that has least frequently updated blocks. This mechanism will lower the write amplification.

Many embodiments/claims for non-volatile memory read and write logic are based on block based flash memory. Those embodiments/claims can be true for any block based non-volatile memory including but not limited to ReRAM/PCM/3D XPoint etc.

The recovery process scans the WAL from the most recent checkpoint. The state of the storage engine at the checkpoint is its most recent consistent state before the crash. The WAL has information about all the modifications (PUT/DELETE) happened in the system before crash and after the checkpoint. Replay of the operations in the WAL chronologically from the checkpoint would recover the data. Also the replayed operations can be written to the data buffer again which will eventually be persisted on non-volatile memory. In this case the data buffer itself will act as a cache.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

Distributed data store system 206 for data storage, retrieval and processing will use embedded data stores as data nodes. Data distribution 208 mechanism in the distributed system is comprised of plurality of data placement 209 and replica selection policies which provide fault-tolerance. Data distribution process use existing consistent hashing or range-based partitioning or other available data distribution methods and implementation available. It will directly incorporate plurality of existing data distribution mechanism and provision one for specific data set.

The invention claimed is:

1. A system comprising:
An embedded data store on a single node, comprising:
A plurality of processes executing on a plurality of processors for storing, retrieving and processing data across memory hierarchy, wherein read and write operations on the embedded data store are performed with key value type of access and the embedded data store serving as backend key value store for any software application or database client;
A data buffer process buffering data arriving into fast memory of the node, wherein the data buffer has a prefix tree index stored in the fast memory and the data arriving is placed in the fast memory or slower byte addressable non-volatile memory thereby avoiding double writing to traditional write ahead logs;
Wherein the data buffer arranges the data in partially stored data partitions having specific non-overlapping key range and achieved using the prefix tree index having a start key of each data partition's lexicographically ordered key range;
A storage engine process providing basic universal key value operations interface including at least get(key), put(key, value), scan(start_key, end_key), delete (key), multiput(key[ ], value[ ]), and multiget (key[ ]);
An indexing process storing the start key of each data partition or data block along with corresponding memory location and providing look up for single key in the data partition's lexicographic ordered key range;
A data block creation process creating an immutable data block to be stored in the non-volatile memory by retrieving and merging data from particular data block and particular data buffer partitions;
A recovery process incorporating an index recovery method which persist index as baseline with incremental deltas and recover the prefix tree index and incorporating recovery of the data using checkpointing mechanism and Write Ahead Log (WAL) when the data is not directly buffered in byte addressable non-volatile memory wherein checkpoint mechanism is utilized to provide snapshot and the write ahead logs are written to multiple hard disk drives or faster non-volatile memory configured in RAID 1 stripping over one or more disks.

2. The system of claim 1, further comprising one or more different type of non-volatile memory; a corresponding prefix tree index is used for each type of said non-volatile memory for storing the start key of each data block, wherein the corresponding prefix tree index have different types of interchangeable nodes based on maximum child nodes.

3. The system of claim 2, wherein each of the data partition has log-structured keys list to simplify insert of key value and has sorted keys list.

4. The system of claim 3, wherein the data is moved to next slower non-volatile memory level in the memory hierarchy minimizing write amplification by finding dirty block and dirty partitions for merge by keeping additional metadata information in the corresponding prefix tree node for particular memory.

5. The system of claim 4, wherein the data buffer directly writes key values to the byte addressable non-volatile memory.

6. The system of claim 5, wherein the value of the key internally consist of multiple key values recursively, each key value inside value representing column for key, a column for timestamp and a column for value.

7. The system of claim 6, wherein the data blocks are compatible to SSTable, wherein analytical distributed data processing are supported on the data comprising of the data blocks due to the compatibility with SSTable when the embedded data store is used as storage engine in any distributed system.

8. The system of claim 7, wherein the embedded data store is integrated as a storage engine to any distributed database or data store.

9. The system of claim 7, wherein the metadata information kept inside the index is used to develop efficient garbage collection and classifying the data blocks.

10. The system of claim 7, wherein the data block in the system is written to a single unit of erase block in block-erase based non-volatile memories like flash memory.

11. The system of claim 3, wherein the embedded data store is configured to store all data in fast memory for extreme fast performance.

12. The system of claim 1, wherein the data buffer process incorporates at least data buffer management including creating, rearranging, deleting partition, data merging across partitions and data buffer index updating.

* * * * *